United States Patent
Furukawa et al.

(10) Patent No.: US 7,710,480 B2
(45) Date of Patent: May 4, 2010

(54) SCANNING CIRCUIT OF IMAGE SENSOR

(75) Inventors: Makoto Furukawa, Sayama (JP);
Sukeyuki Shinotsuka, Sayama (JP);
Jiro Kurita, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 1207 days.

(21) Appl. No.: 11/256,510

(22) Filed: Oct. 21, 2005

(65) Prior Publication Data

US 2006/0221221 A1    Oct. 5, 2006

Related U.S. Application Data

(63) Continuation of application No. PCT/JP2004/005405, filed on Apr. 15, 2004.

(30) Foreign Application Priority Data

Jun. 11, 2003    (JP)    ............................. 2003-197461

(51) Int. Cl.
*H04N 3/14* (2006.01)
(52) U.S. Cl. ...................................... 348/304; 348/302
(58) Field of Classification Search ................. 348/300, 348/301, 303–307, 313
See application file for complete search history.

(56) References Cited

U.S. PATENT DOCUMENTS

| | | | | | |
|---|---|---|---|---|---|
| 5,933,189 | A | * | 8/1999 | Nomura | 348/302 |
| 6,720,594 | B2 | * | 4/2004 | Rahn et al. | 348/302 |
| 6,801,256 | B1 | * | 10/2004 | Tanaka et al. | 348/294 |
| 7,414,652 | B2 | * | 8/2008 | Shinotsuka | 348/294 |

FOREIGN PATENT DOCUMENTS

| | | |
|---|---|---|
| JP | 9-93492 | 4/1997 |
| JP | 11-266399 | 9/1999 |
| JP | 2000-329616 | 11/2000 |
| JP | 2002-369080 | 12/2002 |

* cited by examiner

*Primary Examiner*—Luong T Nguyen
(74) *Attorney, Agent, or Firm*—Fulbright & Jaworski LLP

(57) ABSTRACT

A scanning circuit of an image sensor using light sensor circuits each representing a unit pixel and producing a sensor signal corresponding to a current flowing in a photoelectric converting element, in which pixel signals are saturated by previously turning on the light sensor circuits and sequentially reading saturated pixel sensor signals, achieving stable and high-speed reading-out of the sensor signals from the image sensor.

12 Claims, 16 Drawing Sheets

SCANNING CIRCUIT OF IMAGE SENSOR

CROSS-REFERENCE TO RELATED APPLICATIONS

This is a continuation of International Patent Application No. PCT/JP2004/005405, filed 15 Apr. 2004 and claiming priority from JP2003-197461, filed 11 Jun. 2003, the disclosures of which are incorporated herein by reference.

BACKGROUND OF THE INVENTION

The present invention relates to a scanning circuit for reading pixel signals of an image sensor comprised of a number of pixel light sensor circuits each representing a unit pixel and being capable of producing in a photoelectric converting element a photo current proportional to a quantity of incident light falling thereon.

Japan Laying Open Patent Publication No. 2000-32961 discloses a conventional image sensor, in which a pixel light sensor circuit used as a unit pixel comprises, as shown in FIG. 1, a photo-diode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd, a transistor Q2 for amplifying the voltage signal Vpd and a transistor Q3 for outputting a sensor signal So in accordance with a timing pulse of a readout signal Vs and which circuit is characterized by its a wide dynamic range obtained by giving the output a logarithmic characteristic, thereby achieving the high sensitivity of detecting a light signal.

FIG. 2 illustrates an exemplary construction of an image sensor comprising a number of the above-described pixel light sensor circuits arranged to form a matrix of pixels, wherein sensor signals from respective pixels are read by scanning in a time series.

The image sensor shown in FIG. 2 is composed of 4×4 pixels D11-D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner that selecting signals DS1~DS4 successively output from a pixel selecting circuit 2 turn on corresponding switches SW11~SW14 in a group 3 to read respective pixel signals Vo in a time series. In FIG. 2, numeral 4 designates a power source for gate voltage VG of the transistor Q1 and numeral 6 designates a power source for a drain voltage VD of the transistor Q1. The image sensor is provided with a bias circuit 7 for applying a bias voltage +Vcc through respective reference resistances R1-R4 onto the output sides of respective pixels in one line, whereby respective pixel sensor signals So are output as voltage signals Vo.

The image sensor is also provided with a voltage switching-over circuit 5 to initialize each pixel light sensor signal circuit before detecting a pixel signal Vo by removing electric charge accumulated in a parasitic capacity C of each pixel light sensor circuit by changing a drain voltage VD of the transistor Q1 from a high level H to a lower level L for a specified period under the control of a control circuit (not shown), thereby preventing the occurrence of afterglow of each pixel due to the effect of remaining charge in the parasitic capacity.

A pixel line selecting circuit 1 and a pixel selecting circuit 2 are composed each of a shift-register circuit which is driven synchronously with each other under the control of the control circuit (not shown).

FIG. 3 shows a time chart of the operation of respective portions of the above-described image sensor.

The above-mentioned image sensor however involves such a problem that, when switches SW11-SW14 were turned on to read respective sensor signals Vo from the respective pixels, it takes time for a voltage signal to rise to a value specified by the bias circuit 7 due to a small current capacity of the output transistor Q3 for each pixel, thereby causing variations in pixel sensor signals read in a time series from respective pixels. As the result of this, the image sensor cannot at high speed read respective pixel signals.

To solve the above-described problem, it was attempted to increase the speed of reading the sensor signals by providing a buffer circuit 8 between a group 3 of output switches and a bias circuit 7, as shown in FIG. 4, so that pixel light sensor signals Vo read from the respective pixels can be stored in buffer amplifiers BF1-BF4 during a period of charging each parasitic capacity C in accordance with a photoelectric current for each pixel.

A drawback of this attempt is that it is accompanied by a significant increase in power consumption of the image sensor because of turning on all buffer amplifiers BF1-BF4.

Japanese Laying Open Patent Publication No. H09-93492 also discloses a conventional image sensor in which two shift registers are alternately switched on for reading pixel signals from a charge coupled device (CCD) to create an one-pixel delay in reading two signals. This enables the image sensor to read out pixel signals at an increased speed and output the pixel sensor signals at high stability.

The problem to be solved by the present invention is such that the conventional image sensor using a plurality of pixel light sensor circuits each representing a unit pixel and being capable of producing a sensor signal corresponding to a photo current flowing in a photo-electric converting element requires time for a sensor signal to reach a specified voltage value when reading the sensor signal, causing variations in sensor signals readout in a time series and thereby making it impossible to increase the speed of reading pixel signals.

SUMMARY OF THE INVENTION

Accordingly, an object of the present invention is to provide a scanning circuit for reading out light sensor (pixel) signals from an image sensor using light sensor circuits each representing a unit pixel and being capable of producing a pixel light sensor signal corresponding to an photocurrent flowing in a photoelectric converting element, which scanning circuit is capable of stably reading pixel signals at a high speed by using a simple means of saturating each of the light sensor signals by previously turning on respective light sensor circuits, thereby eliminating the need of providing buffer circuits for temporally storing respective pixel signals and/or two shift registers for alternately reading respective pixel signals with a delay from each other.

PREFERRED EMBODIMENTS OF THE PRESENT INVENTION

Figure 1:
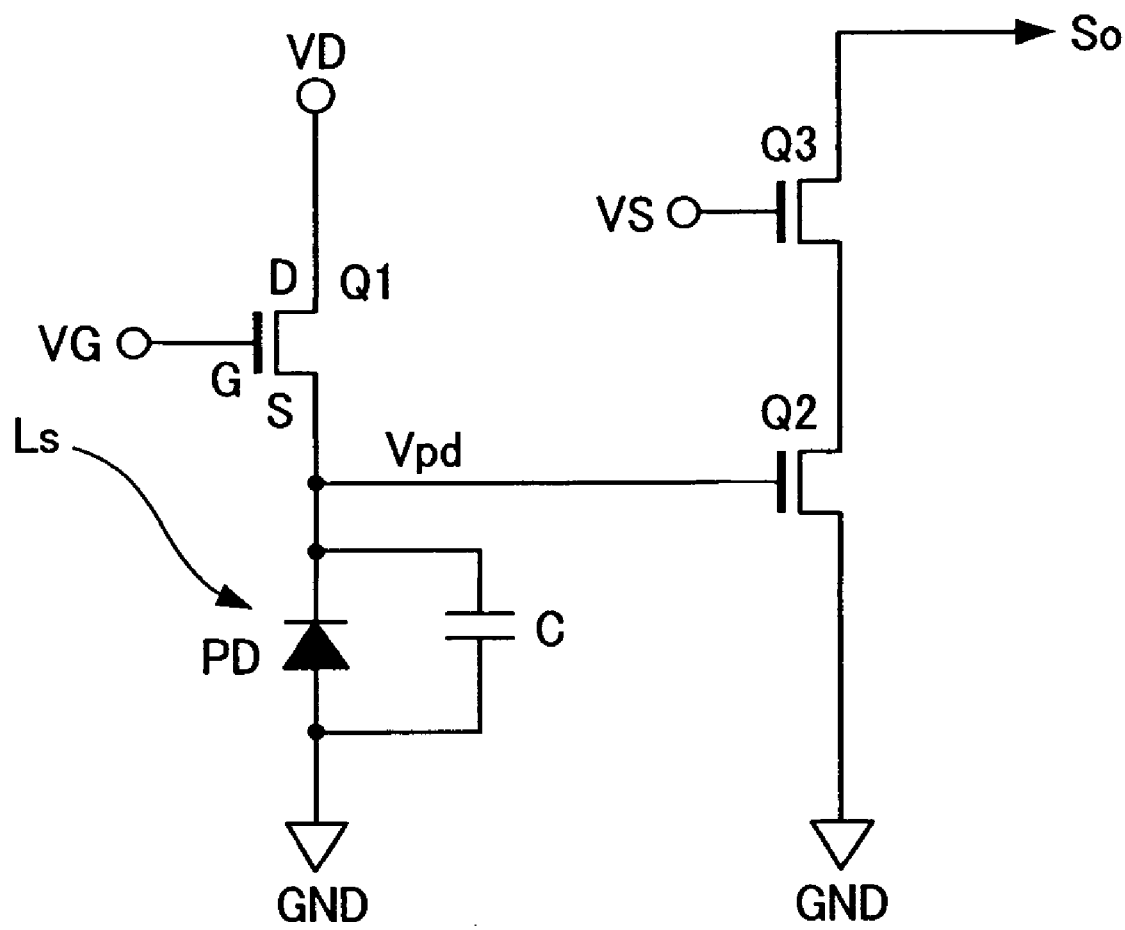
FIG. 1 is an electric circuit diagram of a light sensor circuit for one pixel, which is used as a unit component of an image sensor.
Figure 2:
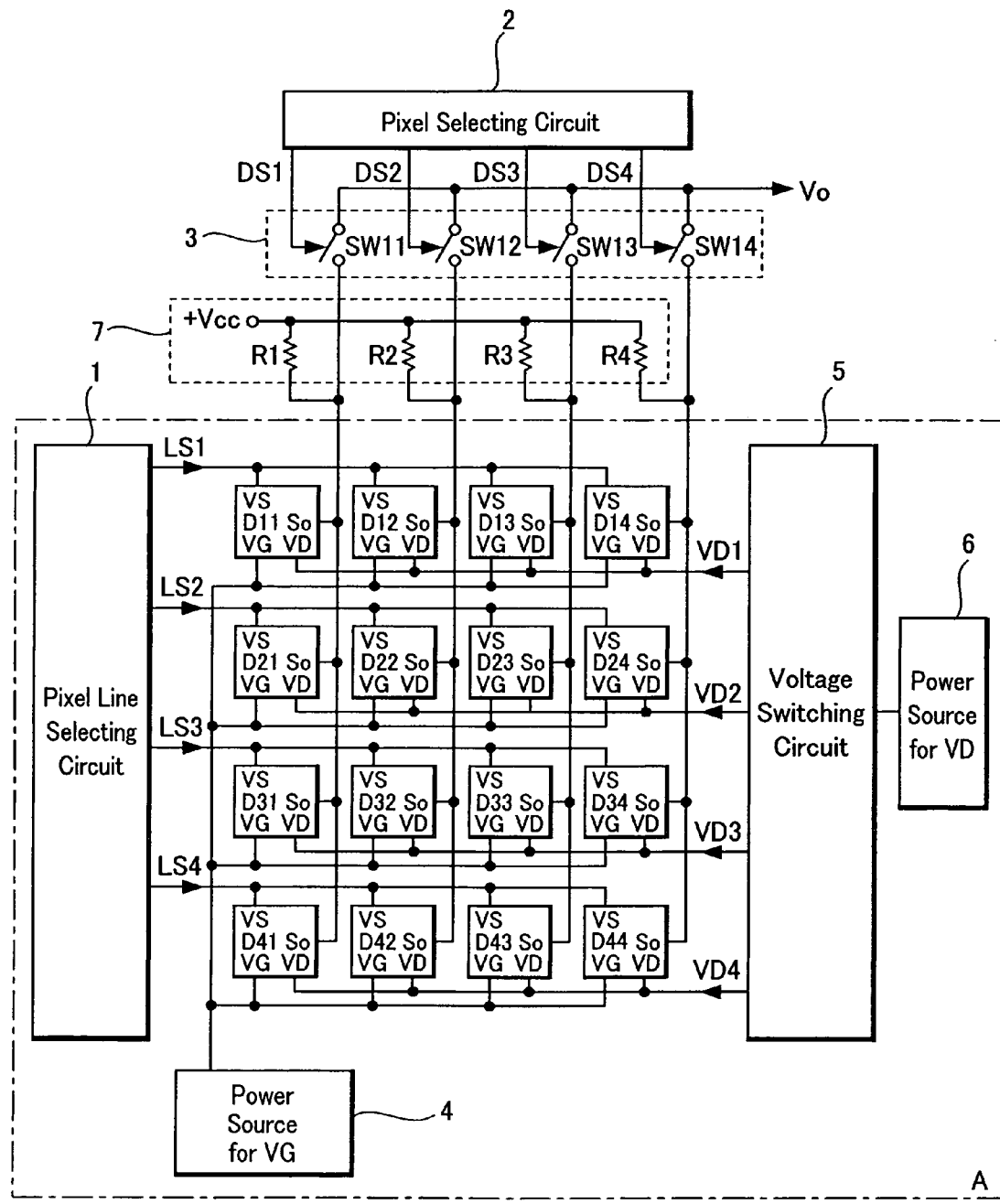
FIG. 2 is a basic electric circuit diagram of an image sensor using a plurality of the light sensor circuits each representing a unit pixel.
Figure 3:
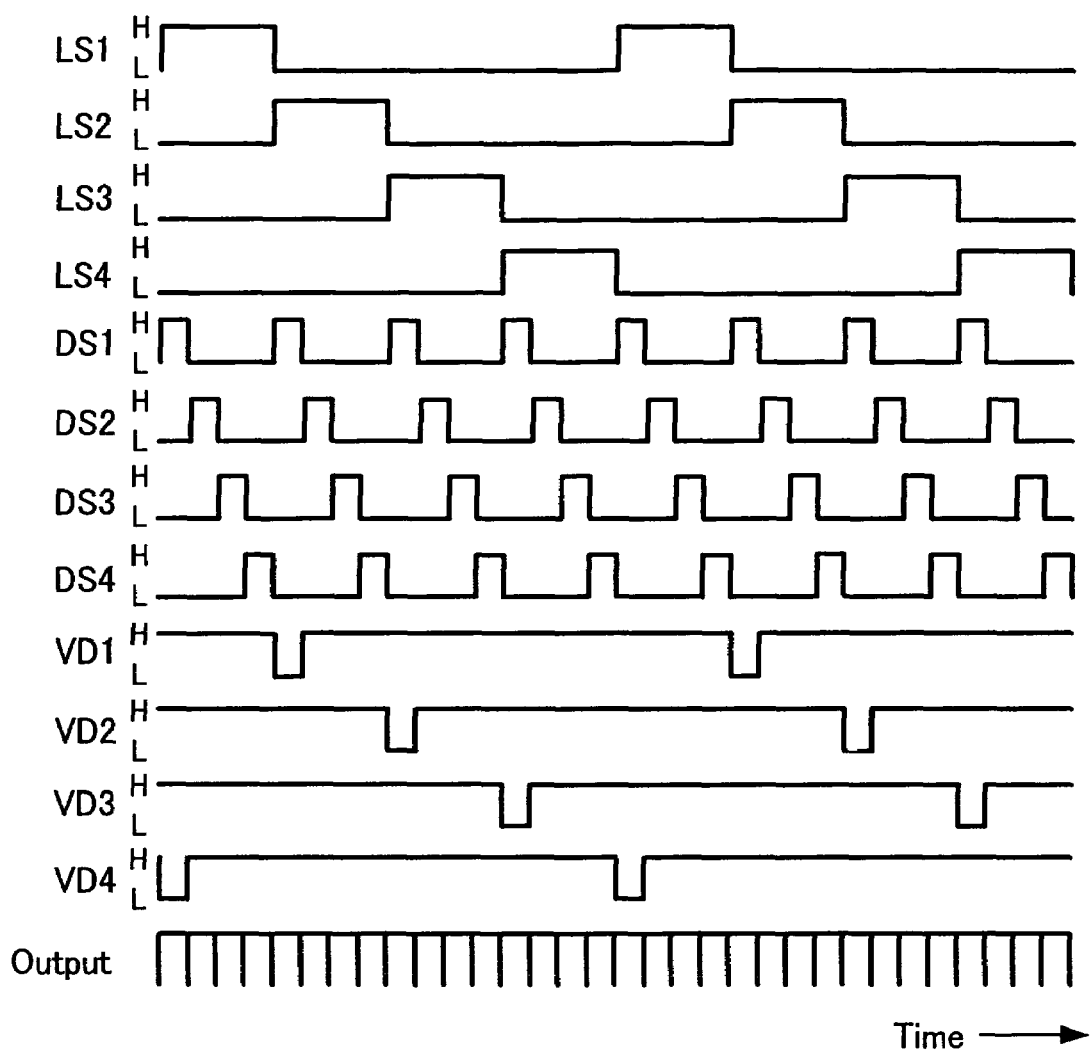
FIG. 3 is a time chart of signals to be generated in respective portions of the image sensor of FIG. 4.
Figure 4:
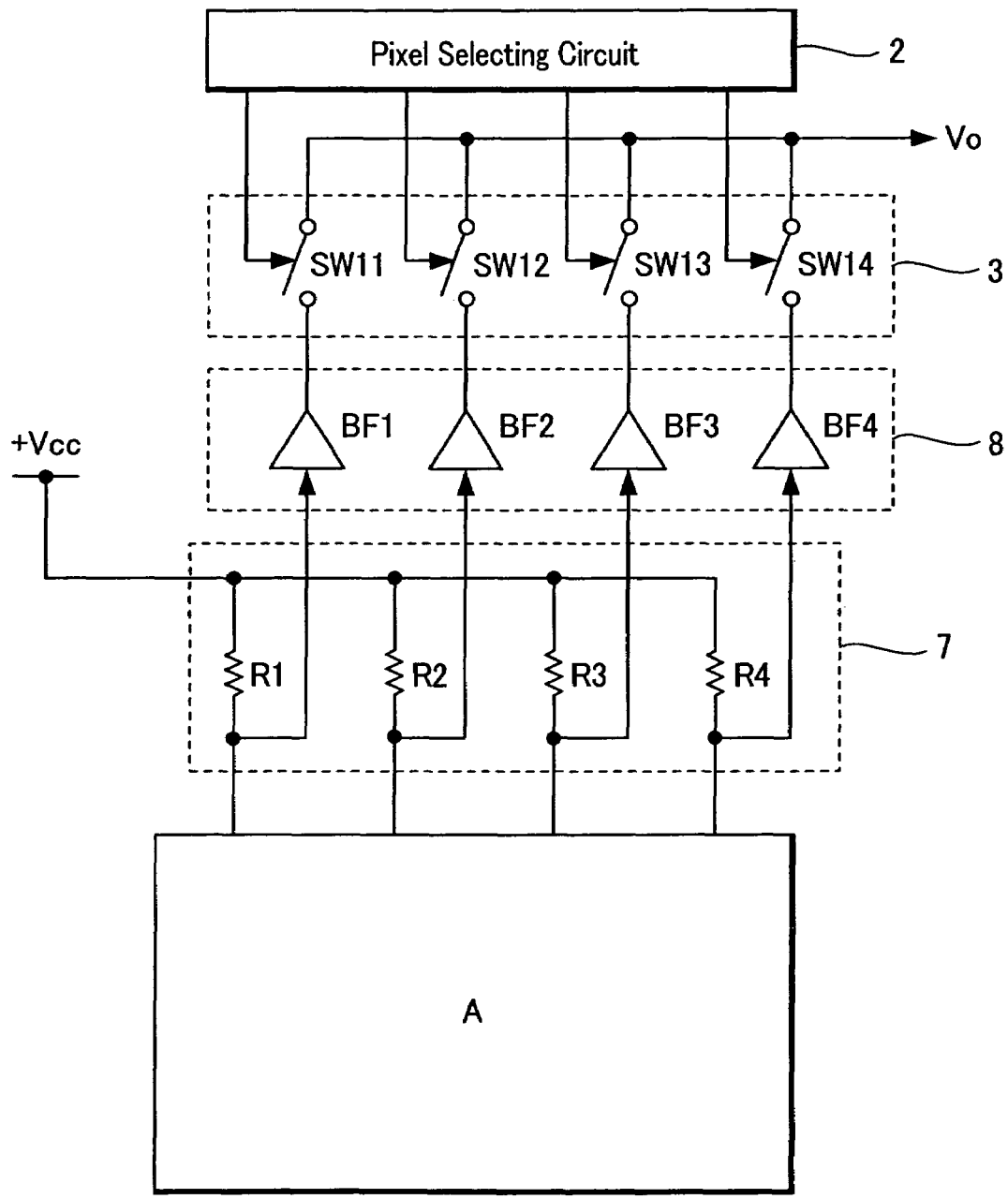
FIG. 4 is an electric circuit diagram of an image sensor provided on its output side with a buffer circuit for increasing the speed of reading respective pixel signals.
Figure 5:
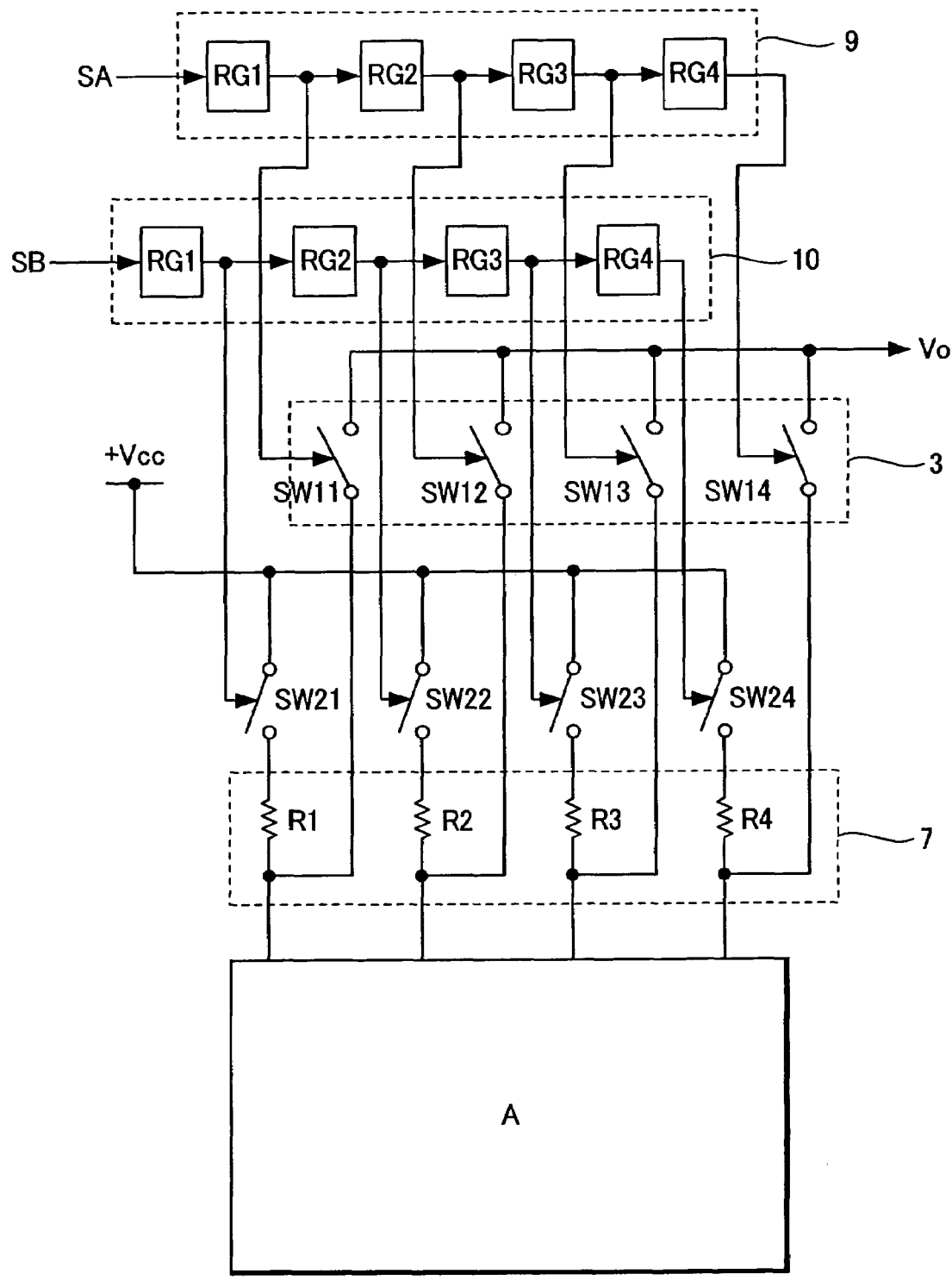
FIG. 5 is an electric circuit diagram of a scanning circuit of an image sensor, which is an embodiment of the present invention.

In an image sensor constructed as shown in FIG. 2, a scanning circuit according to the present invention comprises switches SW21-SW24 connected in series with reference resistances R1-R4 respectively of a bias circuit 7 provided on the output side of respective pixels (light sensor circuits) as shown in FIG. 5. The switches SW21-SW24 are turned on one by one by the effect of a special shift-register circuit 10 prior to reading of light sensor signals Vo of respective pixels under the control of the controller (not shown). Thus, a bias voltage +Vcc can be applied to the reference resistances R1-R4 of the bias circuit 7 for a relatively long period of time enough to make respective pixel signal rise to a specified value in a saturated state. In this state, a pixel-selecting shift register circuit 9 (pixel selecting circuit 2) turns on respective output switches SW11-SW14 one by one to read out respective pixel sensor signals Vo in a time series.

Figure 6:
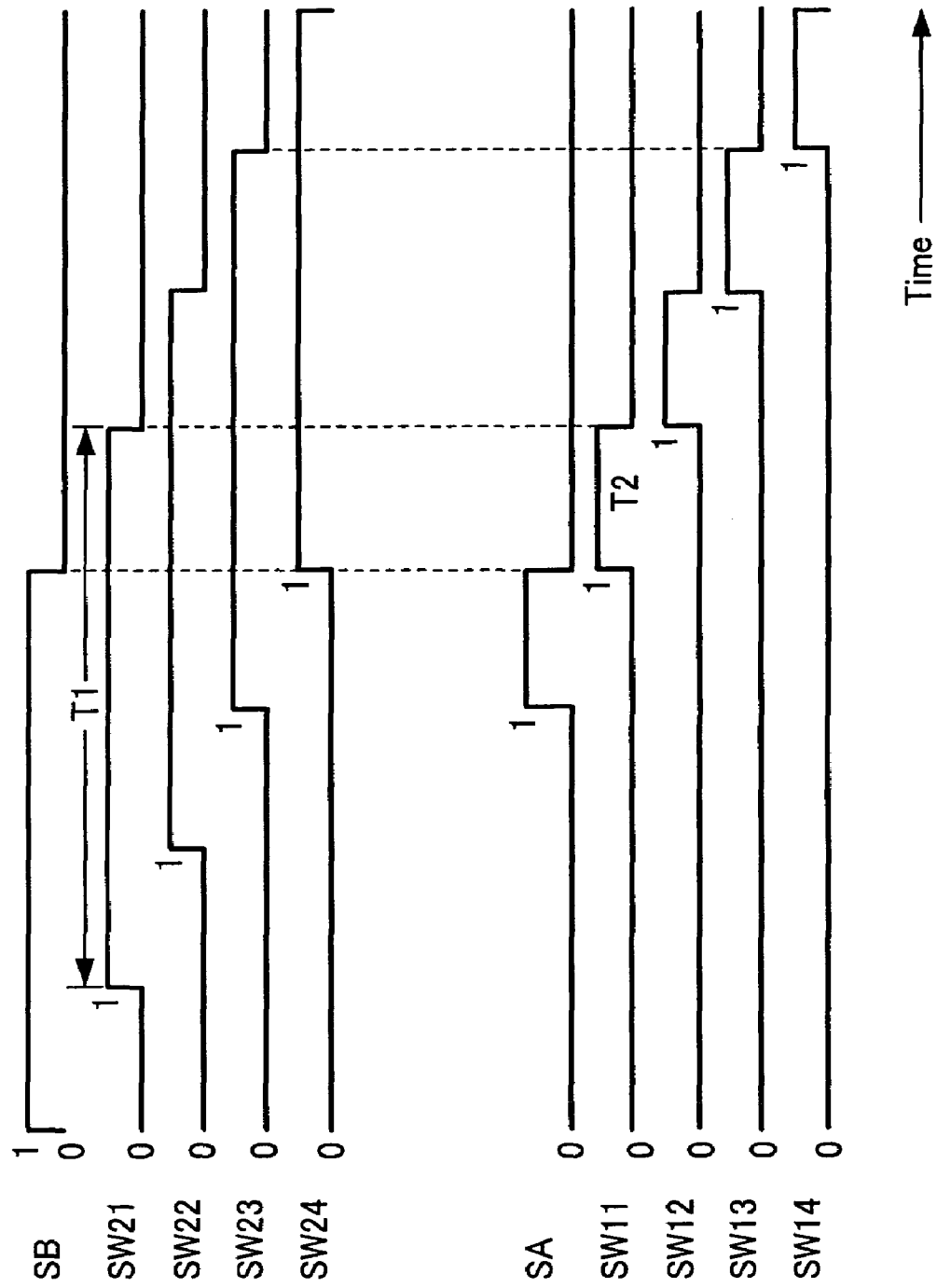
FIG. 6 is a time chart illustrating an example of operations of turning-on switches and output switches in the embodiment shown in FIG. 5.

FIG. 6 shows the operation of the turning-on switches SW21-SW24 and the output switches SW11-14. In FIG. 6, a turned-ON signal SB being at a high level for a relatively long period T1 is applied to the shift register circuit 10 wherein it is shifted with a delay time T2 from one to another register, thereby turning on the respective switches SW21=SW24 one by one. A switch signal SA being at a high level for a period T2 necessary to read out respective pixel sensor signals at specified timing is applied to a shift register circuit 9 so as to turn on the output switches SW11-SW14 one by one for a period T2 starting at the end of the period T1 for turning-on the switches SW21-24.

Figure 7:
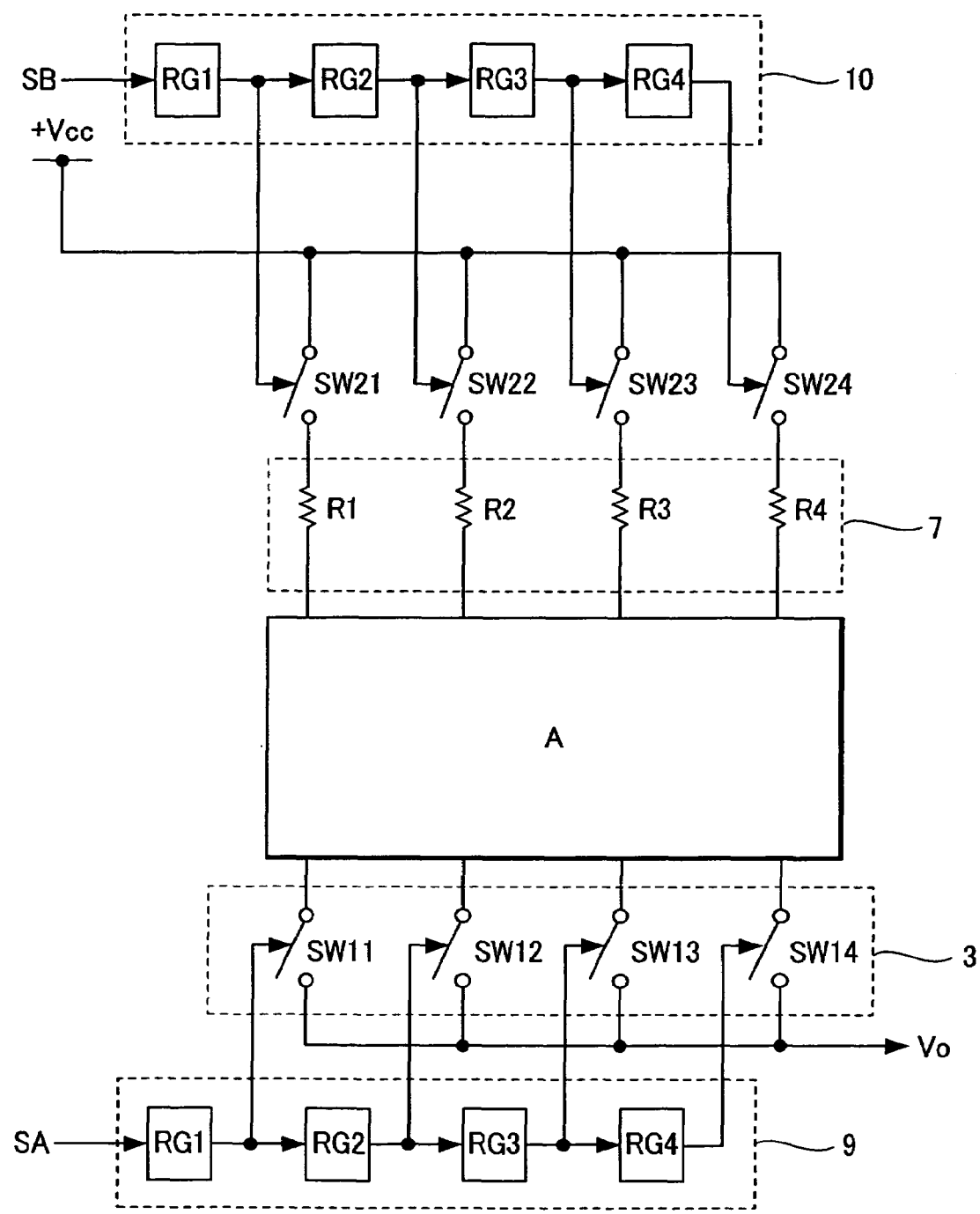
FIG. 7 is an electric circuit diagram of a scanning circuit of an image sensor, which is another embodiment of the present invention.

FIG. 7 illustrates an image sensor scanning circuit according to another embodiment of the present invention, wherein a bias circuit 7 comprising turning-on switches SW21-SW24 and a shift register circuit 10 are arranged above an array of pixels and a pixel-selecting shift register circuit 9 and a group 3 of output switches SW11-SW14 are arranged below the array of pixels.

Figure 8:
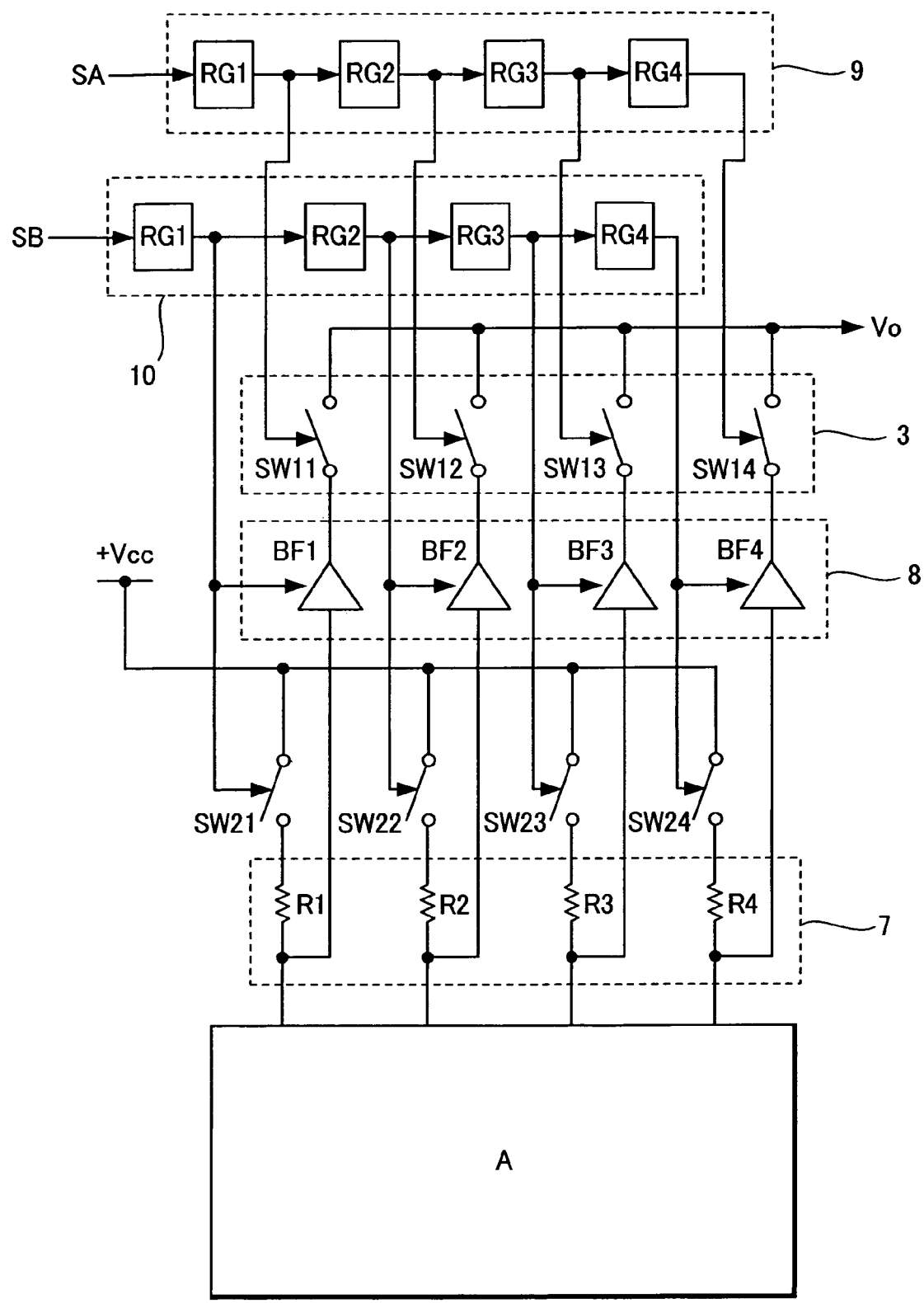
FIG. 8 is an electric circuit diagram of a scanning circuit of an image sensor, which is another embodiment of the present invention.

FIG. 8 shows another embodiment of the present invention, wherein a buffer circuit 8 is provided between a group 3 of output switches and a bias circuit 7 so that respective buffer amplifiers BF1-BF4 may be driven not simultaneously but sequentially by sequentially turning on the respective switches SW21-SW24 by the effect of a shift register circuit 10. This embodiment can thus read pixel sensor signals Vo more stably at a higher speed. Since the buffer amplifiers BF1-BF4 in the buffer circuit 8 are driven not simultaneously but sequentially, the power consumption of the device can be effectively saved.

Figure 9:
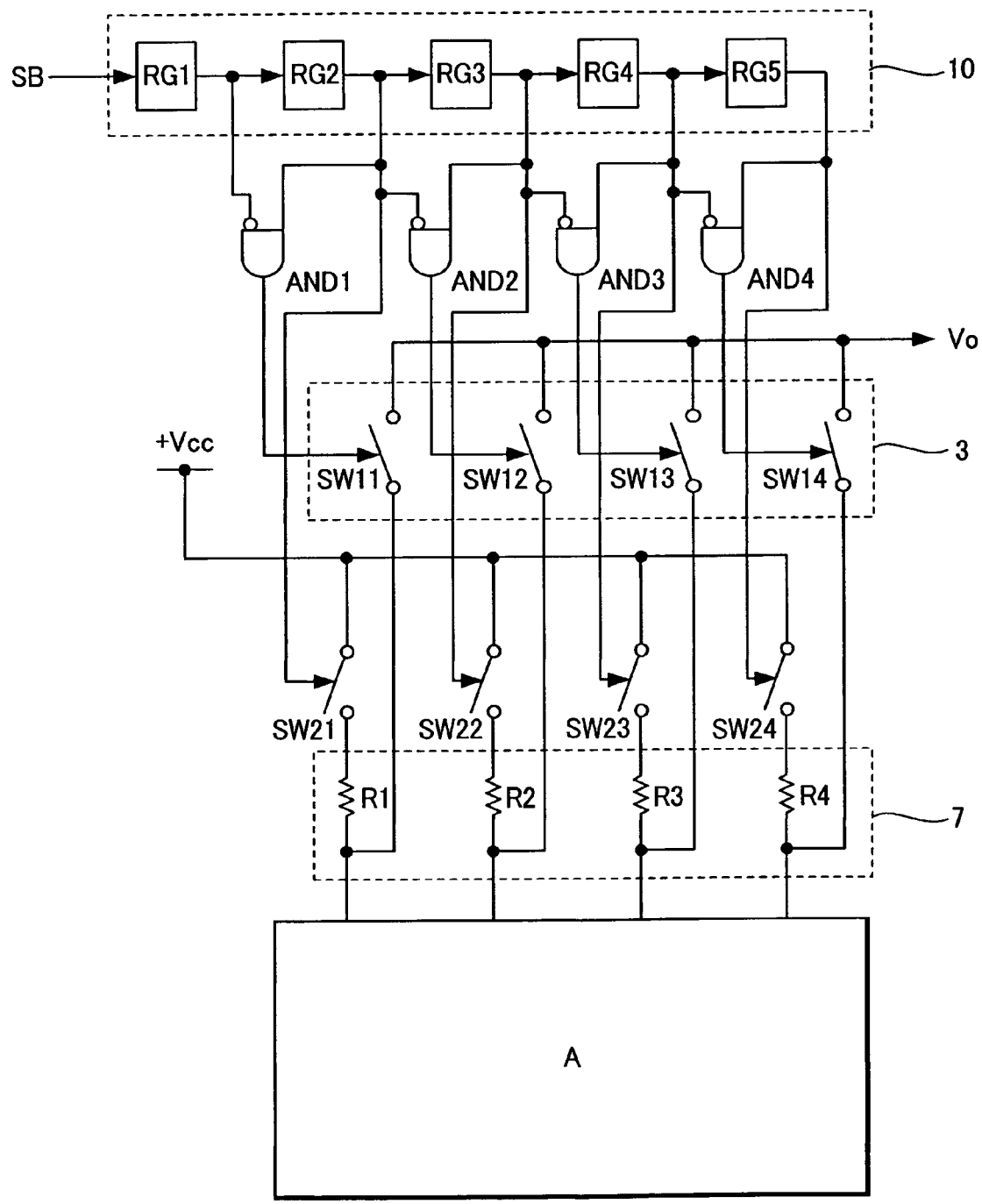
FIG. 9 is an electric circuit diagram of a scanning circuit of an image sensor, which is a further embodiment of the present invention.

FIG. 9 illustrates another embodiment of the present invention, which is provided with a shift register circuit 10 for actuating turning-on switches SW21-SW24 and AND-circuits AND1-AND4 without using a shift register circuit 9 (pixel selecting circuit 2) for selecting pixels.

In this embodiment, a switching-on signal SB being maintained at a high level for a period T1 is input to the shift register circuit 10 wherein it is shifted to sequential positions (registers) with a time delay T2. With the signal SB at the second register RG2, the switch SW21 is turned on by the output signal of the register RG2. Then, outputs of registers RG3, RG4 and RG5 sequentially turns on the switches SW22, SW23 and SW24 respectively. An output switch SW11 is also turned on by an output of an AND-circuit AND1 having received a negative (NOT) output signal of the first register RG1 and an output signal of the second register RG2. Similarly, an output switch SW12 is turned on by an output of an AND-circuit AND2 having received a negative (NOT) output signal of the second register RG2 and an output signal of the third register RG3, an output switch SW13 is turned on by an output of an AND-circuit AND3 having received a negative (NOT) output signal of the second register RG2 and an output signal of the third register RG3, and finally an output switch SW14 is turned on by an output of an AND-circuit AND4 having received a negative (NOT) output signal of the fourth register RG4 and an output signal of the fifth register RG5.

Figure 10:
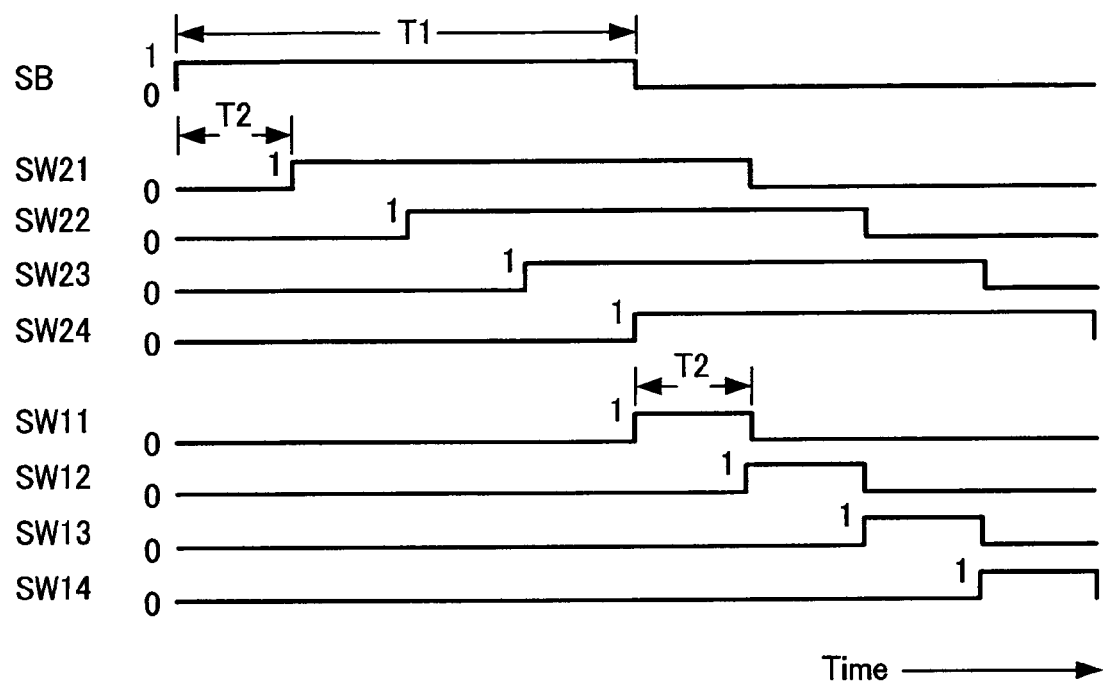
FIG. 10 is a time chart of operations of turning-on switches and output switches when a switch-on signal was inputted to a shift register circuit in the embodiment shown in FIG. 9.

FIG. 10 illustrates the sequence of turning ON of the turning-on switches SW21-SW24 and the output switches SW11-SW14 when the switching-on signal SB was applied to the shift register circuit 10.

Figure 11:
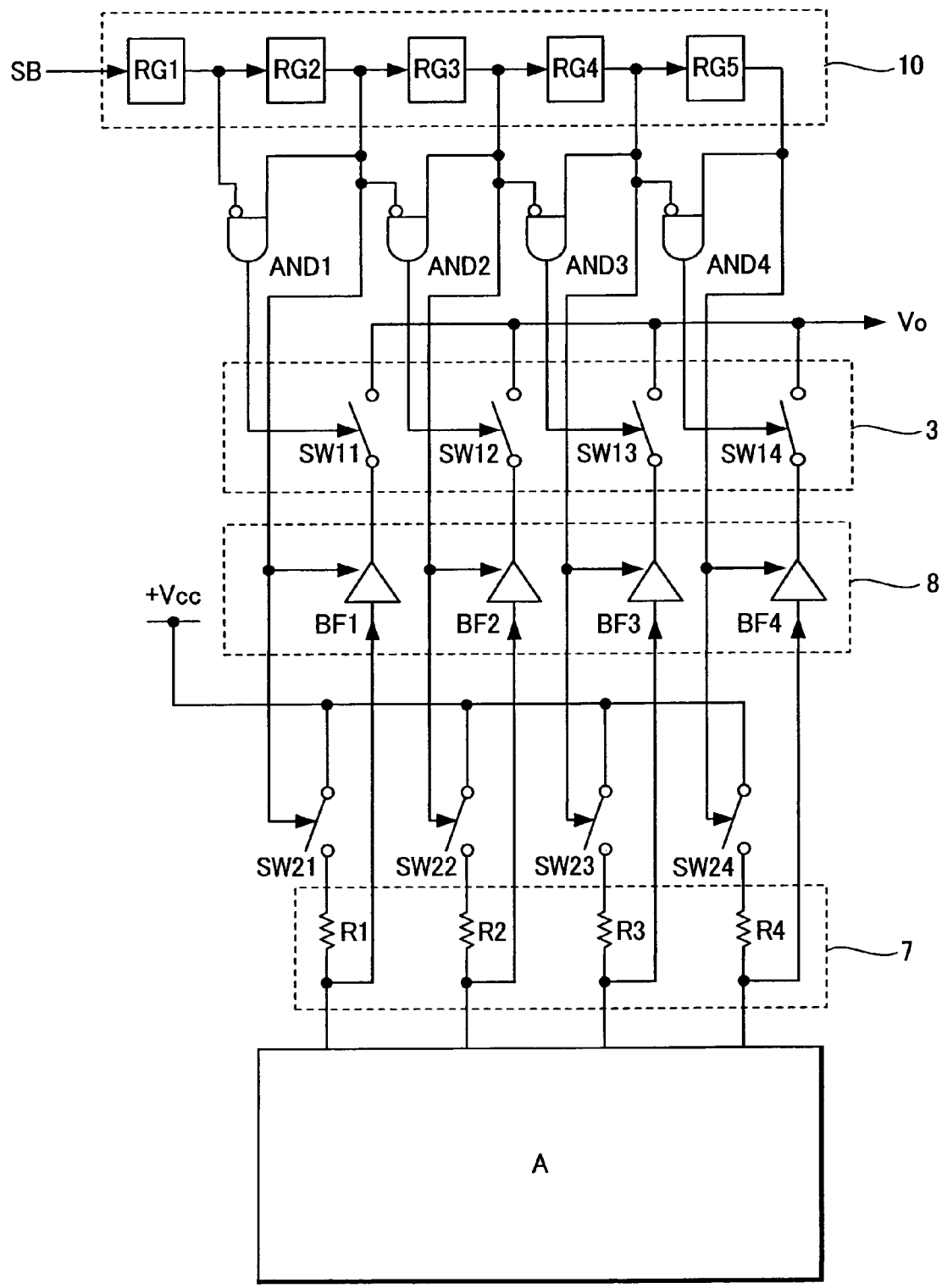
FIG. 11 is an electric circuit diagram of a scanning circuit of an image sensor, which is a still further embodiment of the present invention.

FIG. 11 shows another embodiment of the present invention which is featured by the provision of a buffer circuit 8 between a group 3 of output switches and a bias circuit 7, wherein buffer amplifiers BF1-BF4 of the buffer circuit 8 can be sequentially driven by ON-signals of corresponding turning-on switches SW21-SW24.

Figure 12:
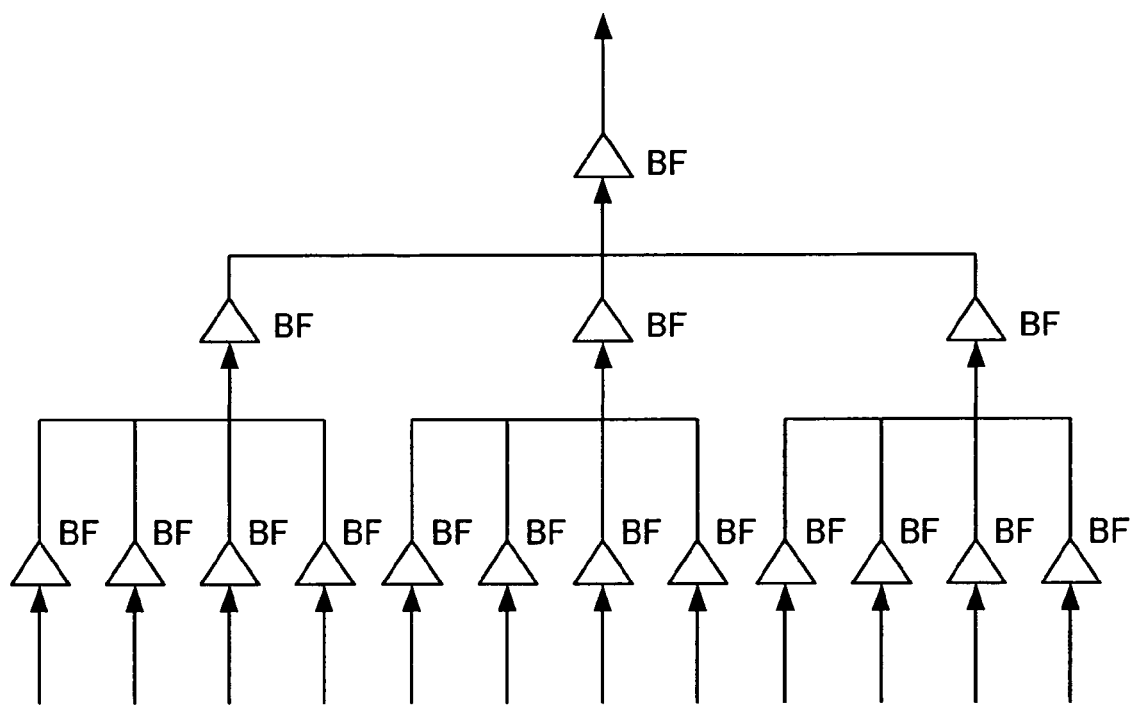
FIG. 12 is an electric circuit diagram of a conventional tree-structured buffer circuits.

To realize high-speed operation of a buffer circuit comprising a plurality of buffer amplifiers having a limited driving capacity per buffer amplifier, it is needed to connect a smaller load to the buffer circuit. For this purpose, the buffer circuit is formed to have a tree structure as shown in FIG. 12, by which a load per buffer amplifier BF can be reduced.

Figure 13:
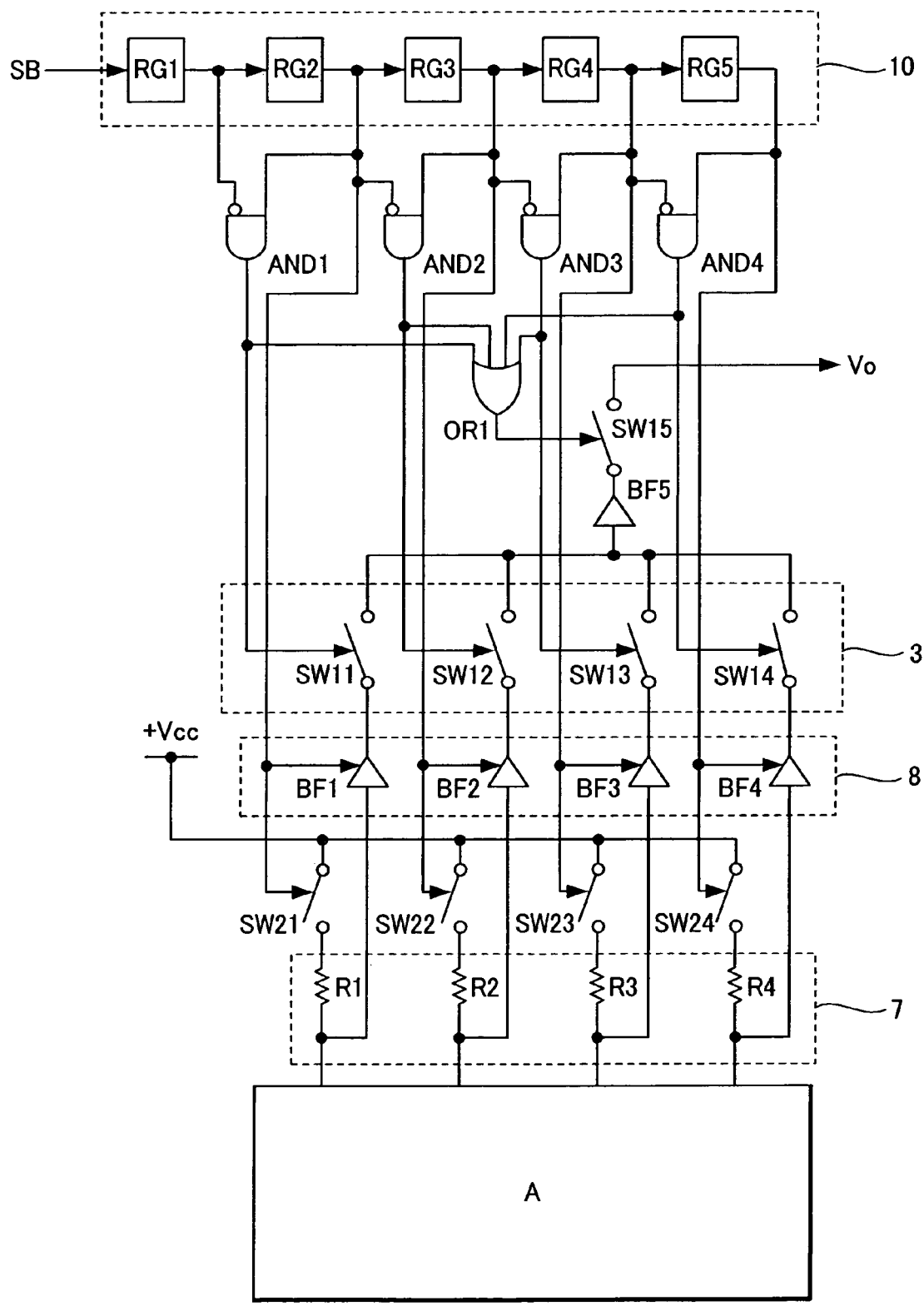
FIG. 13 is an electric circuit diagram of a scanning circuit of an image sensor, which is another embodiment of the present invention.

FIG. 13 is illustrative of an example of an image sensor scanning circuit with a tree-structured buffer circuit 8. In this embodiment, a buffer amplifier BF5 and an output switch SW15 are commonly provided on the output side of the output switches SW11-SW14 and the output switch SW15 is turned on and off by outputs of an OR-circuit OR1 to which output signals from AND-circuits AND2, AND3 and AND4 are inputted.

According to the present invention, a clock signal necessary for causing a shift register circuit 9 for selecting pixels to shift a switching-ON signal SA sequentially to registers therein and a clock signal necessary for causing a shift register circuit 10 to shift a switching-ON signal SB sequentially to registers therein are applied to only register portions of the register circuits 9 and 10 necessary to shift the switching-ON signal SA and SB to the next respective portions.

Figure 14:
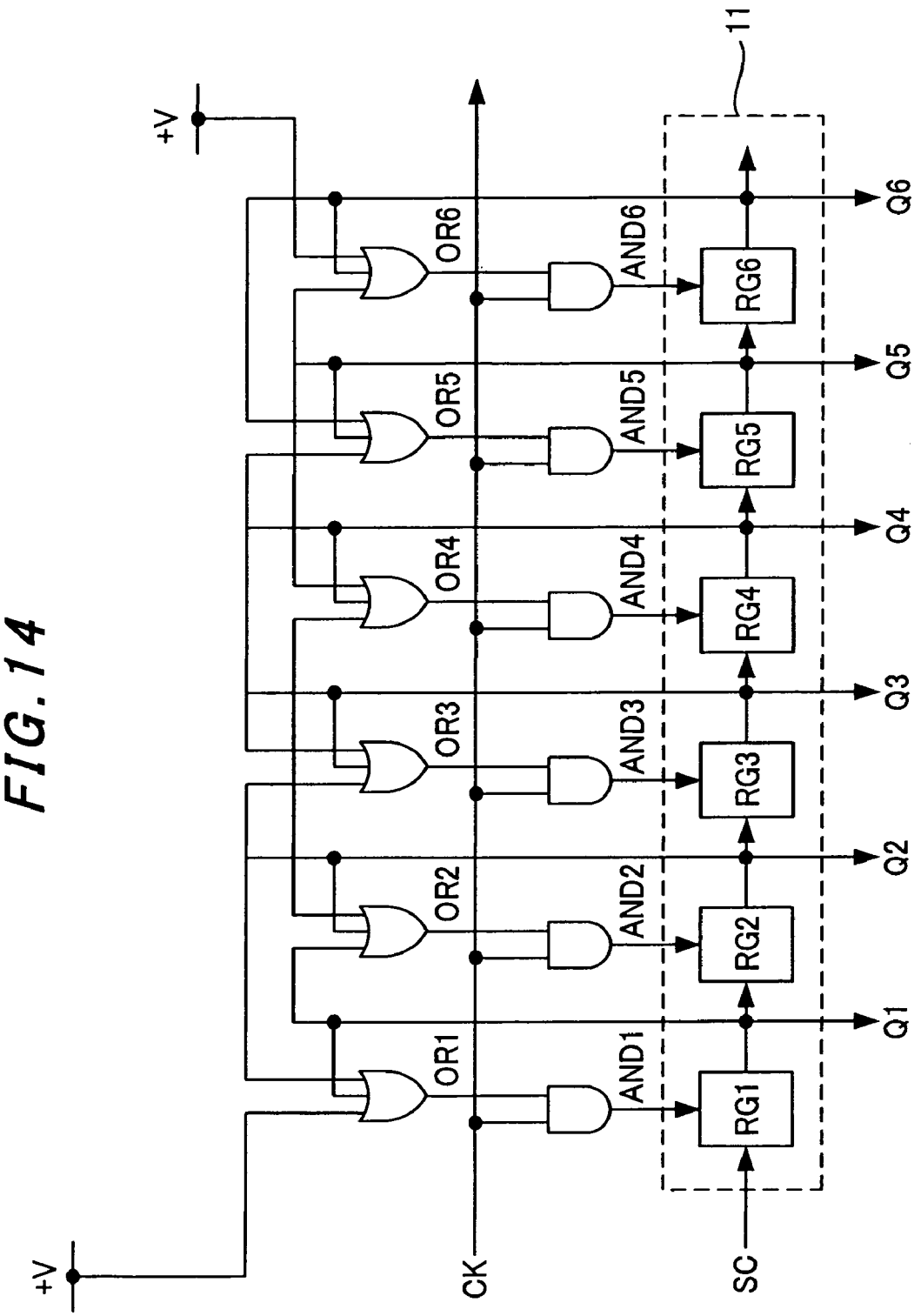
FIG. 14 is an electric circuit diagram of an example of a driving system of a shift-register circuit when a clock signal is given to only a register portion necessary for shifting an input signal.

FIG. 14 shows an example of a system for driving a shift register circuit 11, which gives a clock signal CK only to a register portion necessary to be driven to shift an input signal SC to a next register portion of the shift register circuit 11.

In this example, when the input signal SC shifted to two register portions RG1 and RG2 of the shift register circuit 11 is then shifted to the two register portions RG3 and RG4, outputs Q1 and Q2 of the portions RG1 and RG2 become "1", thereby outputs of OR-circuits OR1, OR2 and OR3 become "1"and a clock signal CK through AND-circuits AND1, AND2 and AND3 is given only to the register portions RG1, RG2 and RG3.

The above-described system capable of selectively giving a clock signal to only the register portions just required to shift the input signal SC to a next portion can offer an advantage of saving power consumption over a conventional system wherein all register portions of a shift register are given normally a clock signal CK and kept in live states. This can effectively prevent the occurrence of noises when a flip-flop composing each register portion is inverted with the clock signal CK.

Figure 15:
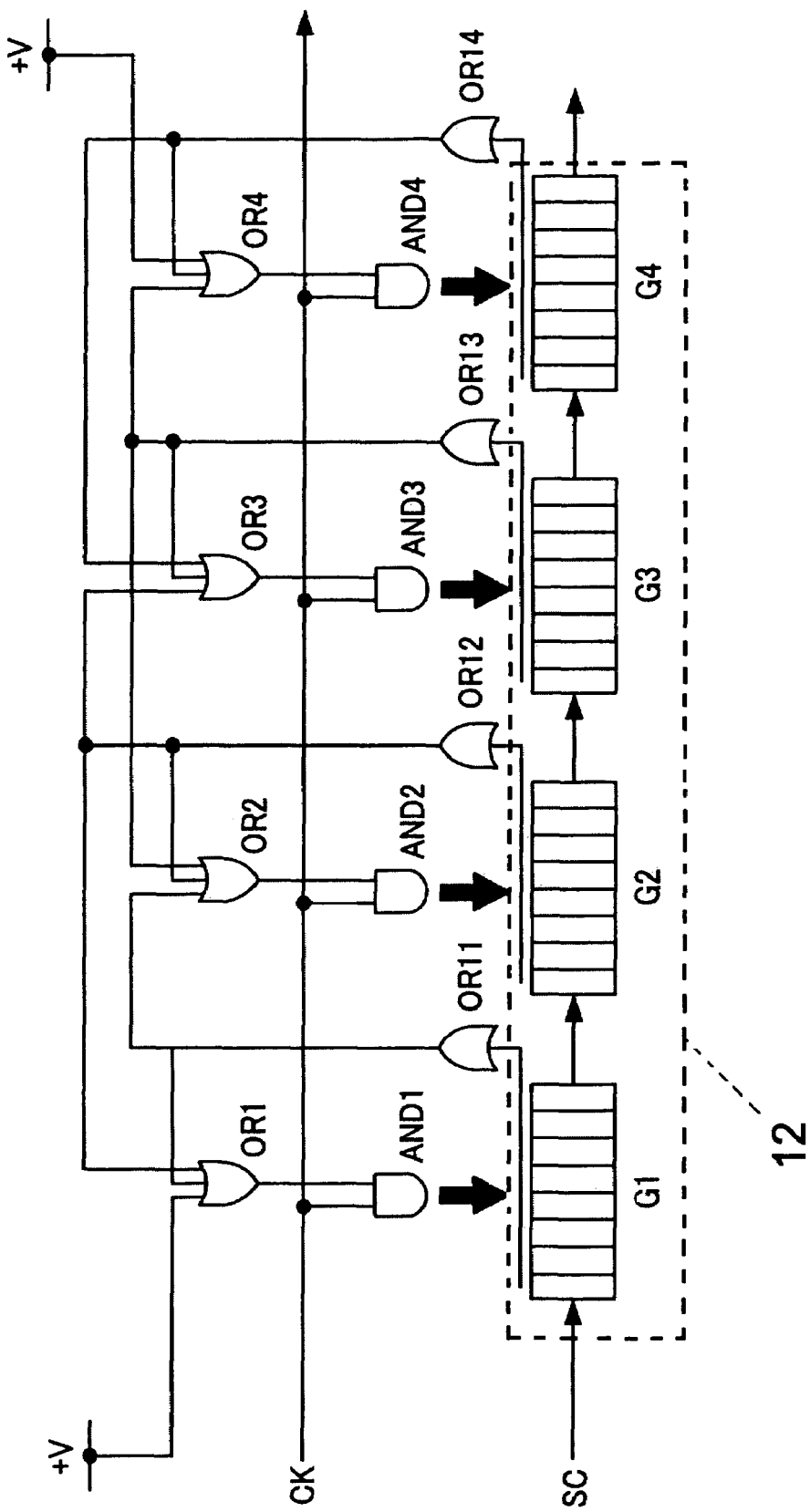
FIG. 15 is an electric circuit diagram of an example of a driving system of a shift-register circuit when a clock signal is given to only one of groups of registers, which is necessary for shifting an input signal.

According to the present invention, a shift register circuit 12 has register groups G1-G4 each consisting of a specified number of registers as shown for example in FIG. 15. In the shown example, a clock signal CK for driving the register circuit 12 into the shifting operation is applied to only register groups GX and G(X−1) (where X=1-4) just required to shift an input signal SC. In this instance, a group G is composed of eight registers RG1-RG8 as shown in FIG. 16.

Figure 16:
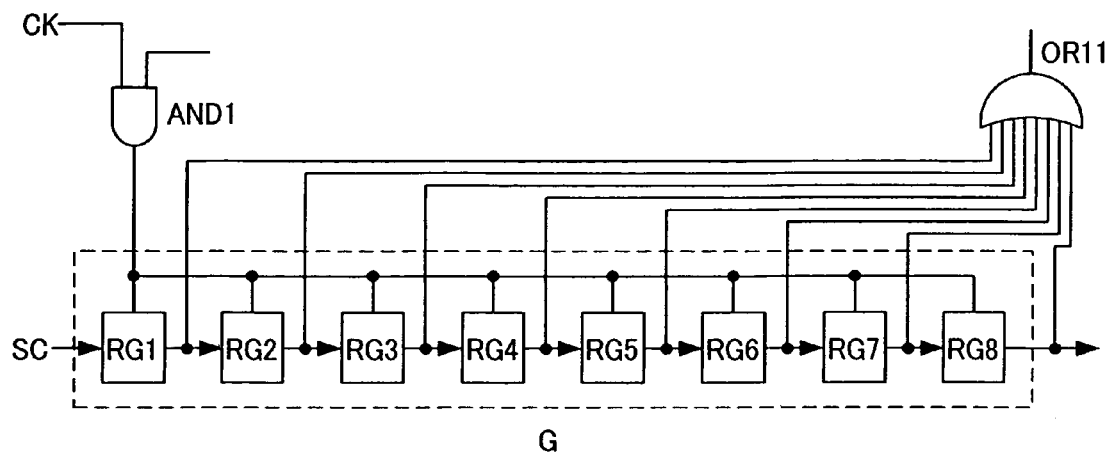
FIG. 16 is an electric circuit diagram of an example of one group of registers.
Figure 17:
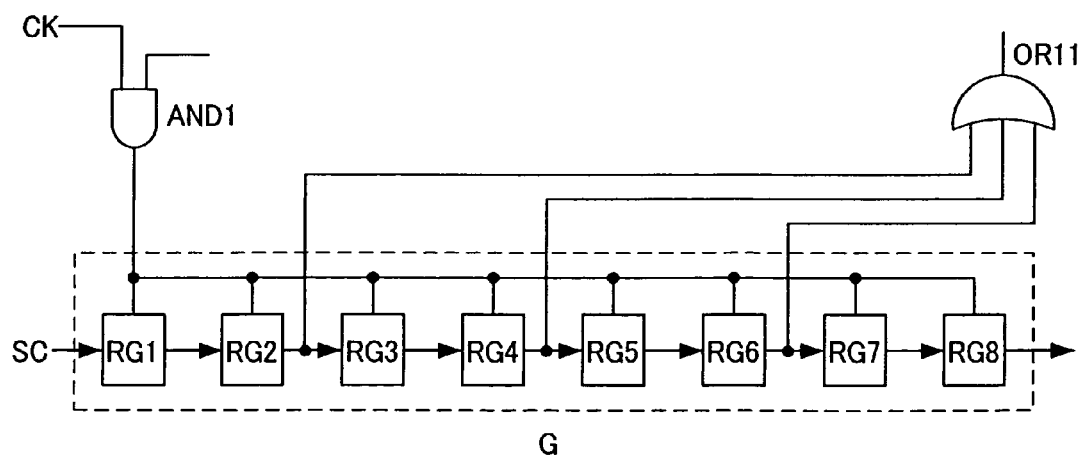
FIG. 17 is an electric circuit diagram of an example of one group of registers.

With an input signal SC being continuous, there is no need of monitoring output states of all the registers RG1-RG8 in the group G as in the case of FIG. 16. For example, when the input signal SC exists through the registers RG1-RG8 as shown in FIG. 17, the existence of the input signal SC within the group G can be confirmed by monitoring the output states of three registers RG2, RG4 and RG6 among the registers RG1-RG8. In this embodiment, the configuration can be simplified.

INDUSTRIAL APPLICABILITY OF THE INVENTION

An image sensor scanning circuit according to the present invention is capable of saturating pixel signals by previously turning-on respective sensor circuits composing an image sensor and reading in a time series saturated pixel signals of the image sensor, thereby achieving stable and high-speed reading-out of pixel sensor signals by using simple means, eliminating the need of providing an additional buffer circuit for temporally storing respective light sensor signals or two shift registers for alternately delaying pixel signals.

What is claimed is:

1. An image sensor scanning circuit for reading out pixel light sensor signals from an image sensor using pixel light sensor circuits each representing a unit pixel and being capable of producing a pixel light sensor signal corresponding to a photocurrent flowing in a photoelectric converting element, wherein a pixel light sensor circuit is provided with a means for saturating the pixel light sensor signal by previously turning on the pixel light sensor circuit and then reading the pixel light sensor signal, wherein the pixel light sensor circuit is provided on the output side of the pixel sensor circuit with a bias circuit having a reference resistance to which a bias voltage through a turning-on switch is applied for saturating the pixel light sensor signal prior to reading thereof by turning on the pixel light sensor circuit.

2. An image sensor scanning circuit as defined in claim 1, wherein the image sensor scanning circuit reads the pixel light sensor signal from each of the pixel light sensor circuits by turning on an output switch in an ending period of an ON-duration of the turning-on switch.

3. An image sensor scanning circuit as defined in claim 1, wherein a buffer circuit is provided between the bias circuit and an output switch.

4. An image sensor scanning circuit as defined in claim 2, wherein a shift register circuit for sequentially shifting a switching-on signal to registers therein is used for sequentially switching-on output switches or turning-on switches and a clock signal for driving the shift register circuit into shifting operation is given to only a register required to shift the switching-on signal.

5. An image sensor scanning circuit as defined in claim 2, wherein a shift register circuit for sequentially shifting a switching-on signal to groups of a specified number of registers therein is used for sequentially switching-on output switches or turning-on switches and a clock signal for driving the shift register circuit into shifting operation is given to only a group of registers required to shift the switching-on signal.

6. An image sensor scanning circuit for reading out pixel light sensor signals, comprising:
    pixel light sensor circuits, each pixel light sensor circuit including a photoelectric converting element generating a photocurrent, the pixel light sensor circuit representing a pixel and producing a pixel light sensor signal corresponding to the photocurrent flowing in the photoelectric converting element; and
    means for saturating the light pixel sensor signal by turning on the pixel light sensor circuit before reading the pixel light sensor signal, the pixel light sensor circuit further including an output side, the means for saturating the pixel light sensor signal including a sensor circuit turn-on switch with a bias voltage and a bias circuit on the output side having a reference resistance, the sensor circuit turn-on switch having an ON-duration applying the bias voltage to the bias circuit for selectively saturating each pixel light sensor signal by turning on each pixel light sensor circuit before reading the pixel light sensor signal.

7. The image sensor scanning circuit of claim 6 further comprising an output switch selectively sequenced ON for the pixel light sensor circuit during an ending period of the ON-duration for reading the pixel light sensor signal from each of the respective pixel light sensor circuits.

8. The image sensor scanning circuit of claim 7 further comprising a buffer circuit provided between the bias circuit and the output switch.

9. The image sensor scanning circuit of claim 7 further comprising a shift register circuit including registers for respectively switching on output switches and a clock signal to the registers, the clock signal sequentially activating one or more of the registers only when the registers are required to switch on respective one or more of the output switches.

10. The image sensor scanning circuit of claim 7 further comprising a shift register circuit including registers for respectively switching on output switches and a clock signal to the registers, the clock signal sequentially activating groups of a specified number of registers used for sequentially switching-on respective groups of output switches only when the groups of registers are required to switch on the respective groups of output switches.

11. The image sensor scanning circuit of claim 6, the means for saturating the pixel light sensor signal further including a shift register circuit including registers for respectively switching on the pixel light sensor circuits and a clock signal to the registers, the clock signal sequentially activating one or more of the registers only when the registers are required to switch on the respective one or more of the pixel sensor circuits.

12. The image sensor scanning circuit of claim 6, the means for saturating the pixel light sensor signal further including a shift register circuit including registers for respectively switching on the pixel light sensor circuits and a clock signal to the registers, the clock signal sequentially activating groups of a specified number of registers used for sequentially switching-on respective groups of the pixel light sensor circuits only when the groups of registers are required to switch on the respective groups of pixel light sensor circuits.

* * * * *